United States Patent
Bai et al.

(10) Patent No.: US 9,242,191 B2
(45) Date of Patent: Jan. 26, 2016

(54) FILTRATION DEHYDRATION APPARATUS

(71) Applicant: INDUSTRIAL TECHNOLOGY RESEARCH INSTITUTE, Hsin-Chu (TW)

(72) Inventors: Ming-Der Bai, Changhua County (TW); Kuo-Ti Chen, Hsinchu County (TW); Te-Chang Lan, New Taipei (TW); Yun-Huin Lin, Hsinchu (TW); Wen-Chang Lu, Hsinchu (TW); Hom-Ti Lee, Hsinchu (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 369 days.

(21) Appl. No.: 13/711,189

(22) Filed: Dec. 11, 2012

(65) Prior Publication Data

US 2013/0146520 A1    Jun. 13, 2013

Related U.S. Application Data

(63) Continuation-in-part of application No. 13/460,102, filed on Apr. 30, 2012, now abandoned.

(30) Foreign Application Priority Data

Dec. 13, 2011 (TW) .............................. 100146003 A
Sep. 21, 2012 (TW) .............................. 101134684 A (51) Int. Cl.
*B01D 29/64* (2006.01)
*B01D 15/00* (2006.01)
(Continued)

(52) U.S. Cl.
CPC ............... *B01D 15/00* (2013.01); *B01D 29/01* (2013.01); *B01D 29/6423* (2013.01);
(Continued)

(58) Field of Classification Search
CPC ..................................................... B01D 29/705
See application file for complete search history.

(56) References Cited

U.S. PATENT DOCUMENTS

| 4,492,155 A | 1/1985 | Wolkenstein |
| 4,861,495 A | 8/1989 | Pietzsch |

(Continued)

FOREIGN PATENT DOCUMENTS

| CN | 101007226 A | 8/2007 |
| CN | 100355481 C | 12/2007 |

(Continued)

OTHER PUBLICATIONS

Chinese Patent Office, Office Action, Patent Application Serial No. CN201210377010.8, Nov. 13, 2013, China.
(Continued)

*Primary Examiner* — Terry Cecil
(74) *Attorney, Agent, or Firm* — Rabin & Berdo, P.C.

(57) ABSTRACT

A filtration dehydration apparatus, which comprises: a filter, composed of a filtration layer and an absorption layer while allowing the filtration layer that is orientated facing toward the absorption layer to be a first side, and allowing a surface of the absorption layer that is orientated facing toward the filtration layer to be a second side; a supporting structure, for supporting and fixedly securing the filter; a solid waste collector, for collecting solid object left on the first side; and an extrusion unit, for pressing the absorption layer to squeeze out water in the absorption layer; wherein the first side is provided for a solid-liquid mixture to be placed thereon so as to allow the liquid containing in the solid-liquid mixture to flow into the absorption layer through the filtration layer while enabling solid objects in the solid-liquid mixture to be filtered out and thus left on the first side.

12 Claims, 6 Drawing Sheets

(51) Int. Cl.
    *B01D 29/01* (2006.01)
    *B01D 29/70* (2006.01)
    *C02F 11/12* (2006.01)
    B01D 29/05 (2006.01)
    C02F 3/32 (2006.01)

(52) U.S. Cl.
    CPC ........... *B01D 29/705* (2013.01); *C02F 11/122* (2013.01); *B01D 29/05* (2013.01); *B01D 29/6484* (2013.01); *C02F 3/322* (2013.01); *C02F 2303/16* (2013.01)

(56) References Cited

U.S. PATENT DOCUMENTS

| | | |
|---|---|---|
| 5,082,562 A | 1/1992 | Burger |
| 6,871,744 B2 | 3/2005 | Miller et al. |
| 7,334,688 B2 | 2/2008 | Pahl et al. |

FOREIGN PATENT DOCUMENTS

| | | |
|---|---|---|
| CN | 201082370 Y | 7/2008 |
| CN | 101274165 A | 10/2008 |
| CN | 101306911 A | 11/2008 |
| CN | 101525209 A | 9/2009 |
| CN | 101555090 A | 10/2009 |
| CN | 102276129 A | 12/2011 |
| JP | 2007283270 A * | 11/2007 |
| JP | 2011212525 A | 10/2011 |
| TW | 154074 B | 3/1991 |
| TW | 238569 | 1/1995 |
| TW | 246851 | 5/1995 |
| TW | M317287 U | 8/2007 |
| TW | 200800358 A | 1/2008 |
| TW | 200948453 A | 12/2009 |
| TW | 201119726 A | 6/2011 |
| WO | WO-0197948 A2 | 12/2001 |
| WO | WO-2010104876 A1 | 9/2010 |

OTHER PUBLICATIONS

Taiwan Patent Office, Office Action, Patent Application Serial No. TW101134684, Oct. 24, 2014, Taiwan.
Ochirkhuyag et al., "Development of a high-performance cake-less continuous filtration system", Chemical Engineering Science, vol. 63, Issue 21, pp. 5274-5282, Nov. 2008.
Lei et al., "Preliminary Study on Preparation of Ceramic Membrane with Higher Flux and Its Performance in Algae Removal", Water Purification Technology, vol. 1, pp. 63-66, 2009.
Walker, "Filtration technique removes freshwater algae toxins", Membrane Technology, vol. 2007, Issue 9, pp. 9, Sep. 2007.
Zhang et al., "Harvesting algal biomass for biofuels using ultrafiltration embranes", Bioresour Technology, vol. 101, pp. 5297-5304, Mar. 4, 2010.
Grima et al., "Recovery of microalgal biomass and metabolites: process options and economics", Biotechnology Advances, vol. 20, Issues 7-8, pp. 491-515, Jan. 2003.
Hsiao, "A research on the treatment and recycling of the wastewater from Chlorella production using biofiltration", National Sun Yat-sen University, pp. 1-76, 2009.
Wang, "Study on the removal of algae from tap water using filtration", National Taiwan University, 2000.
Lan et al., "MF Combined with Multi-layer Filtration Structure Used in Microalgae Collected and Concentration", Department of Environmental Science and Engineering of National Pingtung University of Science and Technology (NPUST), pp. 1-8, 2010.
Babel et al., "Microfiltration membrane fouling and cake behavior during algal filtration", Desalination, vol. 261, Iss. 1-2, pp. 46-51, Oct. 2010.

* cited by examiner

FILTRATION DEHYDRATION APPARATUS

CROSS REFERENCE TO RELATED APPLICATION

This application is a continuation-in-part of U.S. application Ser. No. 13/460,102 filed on Apr. 30, 2012, now abandoned, the entire contents of which are incorporated herein by reference.

TECHNICAL FIELD

The present disclosure relates to a filtration dehydration apparatus, and more particularly, to a filtration dehydration apparatus capable of operating while having its filter to be fixed motionlessly so as to operate in a cost efficient and energy efficient manner.

BACKGROUND

For protecting our living environment, sewage, being the wastewater released by residences, businesses and industries in a community, must be treated for remove as much of the suspended solids and pollutants as possible before the remaining water, called effluent, is discharged back to the environment. Sewage treatment is a multi-stage process that can include a primary physical/chemical procedure, a secondary biological procedure, and a tertiary fine filtration/adsorption/concentration procedure. Recently, the use of algae in this multi-stage wastewater treatment process is very common and is performed in a way similar to industrial algae cultivation for separating a solid waste (or treated sludge) for disposal from an environmentally safe fluid effluent, and the same time producing algae biomasses to be harvested. Moreover, the harvest of algae biomasses consists of separating algae from the growing medium, drying, and processing it to obtain the desired product. Generally, not to mention that the procedure of algae harvesting and sludge separation is considered to be the key process in the wastewater treatment process, the equipments and facilities required this procedure of algae harvesting and sludge separation can be the most expensive comparing to those other apparatuses used in the wastewater treatment process.

The belt filter press is an industrial machine, which is commonly used for solid/liquid separation processes, particularly the dewatering of sludges in water treatment. The process of filtration is primarily obtained by passing a pair of filtering cloths and belts through a system of rollers. Operationally, the feed sludge to be dewatered is introduced from a hopper between two filter cloths (supported by perforated belts) which pass through a convoluted arrangement of rollers. As the belts are fed through the rollers, water is squeezed out of the sludge. When the belts pass through the final pair of rollers in the process, the filter cloths are separated and the filter cake is scraped off into a suitable container. Generally, after each press, the filter cloths are cleaned by means of water sprays positioned on the return section of the belt for preventing sludge buildup on belt and filter cloths. Nevertheless, not only the cleaning of the filter cloths by water spray is an operation using a lot of clean water and energy, but also it is not guarantee to clean the filter cloths completely and thus in most case, the dewatering performance of those used filter cloths is decreasing with times and eventually required to be replaced. In addition, the shortcomings of a conventional belt filter press further includes: only 40% of the perforated belt is working for dewatering at any given time while allowing the other 60% to be left idle, but only moving along with the rotating rollers; and during a dewatering process in a conventional belt filter press, the sludge to be dewatered is being brought along to move with the moving belt, resulting that the conventional belt filter press will waste most of its energy consumption just to move the heavy load of the sludge; the lifespan of the filter cloths is shorter compared with other device using cloth media since the filter cloths are subjected to a plurality of pressing steps while being twisted, turned and pulled in large angles during a dewatering process; belt filter presses will require to work with the cooperation of a vacuum filtering system for minimize offgas and effluent during operations, and if there is no such system, the belt filter presses can only perform well at lower speed; and a conventional belt filter presses is only suitable for dewatering sludge with comparatively larger solid particles, but is not suitable for algae cultivation industry for harvesting and concentrating delicate algae.

In the conventional algae cultivation, algae generally are harvested by means of mechanical centrifugation. Accordingly, a centrifuge that is driven by a motor is used for removing excess water from a batch of algae harvest by rotating at a high speed. That is, the high speed of rotation creates a high centrifugal force for the water in the algae batch which causes it to be pulled to the outside of the spinning portion of the centrifuge and away from the algae. Thereby, no filter cloth is used and required for cleaning. However, in addition to the high initial cost and operation cost, such centrifuge is also not favored to be used in the algae harvesting since it can be very noisy during operation. Other than that, there is a thin film separation process being developed for algae harvesting and concentration. However, such thin film separation process still has the following disadvantages: small process capacity, high equipment cost, and the thin film can easily be clogged and thus required to be either replaced or processed by an expensive reverse rinse procedure. Consequently, the thin film separation process is not popular.

There are already many studies focused on the improvement of dewatering devices. Nevertheless, none of those studies can provide a new dewatering method different from the conventional belt filter press. That is, the problems of high energy consumption and wear-and-tear in filter belt still remain in the aforesaid studies since the sludge to be dewatered is still being brought along to move with the moving belt during a dewatering process, and thus most of its energy consumption will be wasted just to move the heavy load of the sludge, not to mention that the heavy load of the sludge will cause the supporting belt to withstand a larger pulling force from a convoluted arrangement of rollers. In addition to the lack of means for solving the problems of high energy consumption and wear-and-tear in filter belt, most of the dewatering apparatuses that are currently available require their filter belts to be made of materials with high mechanical strength, and consequently, not only the selection of materials for filter belt is limited, but also the manufacturing cost is increased.

SUMMARY

The present disclosure is to provide a filtration dehydration apparatus, capable of operating while having its filter to be fixed motionlessly so as to operate in a energy efficient manner with high processing capacity. In addition, by the design of capillary principle for dewatering, the filtration dehydration apparatus is equipped with a filter for both filtration and liquid absorption so as to work properly without the cooperation of a vacuum filtering system or a pump pressurization system.

Consistent with the disclosed embodiments, a filtration dehydration apparatus is disclosed, which comprises: a filter, a supporting structure, a solid collector, and an extrusion unit. Wherein, the filter is composed of a filtration layer and an absorption layer while allowing a surface of the filtration layer that is orientated opposite to the absorption layer to be a first side of the filter, and allowing a surface of the absorption layer that is orientated opposite to the filtration layer to be a second side of the filter; the supporting structure is used for supporting the filter in manner that the filter is fixedly secured and positioned by the supporting structure; the solid collector is used for collecting any solid object left on the first side; and the extrusion unit is used for pressing the absorption layer so as to squeeze liquid containing in the absorption layer out of the same. Moreover, in an embodiment of the present disclosure, the first side is provided for a solid-liquid mixture to be placed thereon for allowing the liquid containing in the solid-liquid mixture to flow into the absorption layer through the filtration layer while enabling any solid object in the solid-liquid mixture to be filtered out and thus left on the first side.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
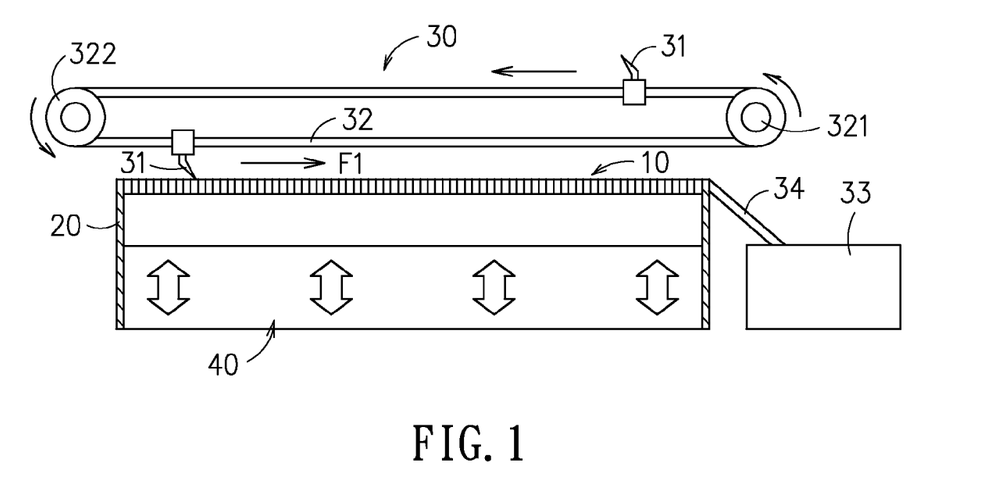
FIG. 1 is a schematic diagram showing a filtration dehydration apparatus in accordance with an embodiment.

Please refer to FIG. 1, which is a schematic diagram showing a filtration dehydration apparatus of the present disclosure. As shown in FIG. 1, the filtration dehydration apparatus comprises: a filter 10, a supporting structure 20, a solid collector 30 and an extrusion unit 40.

Figure 2:
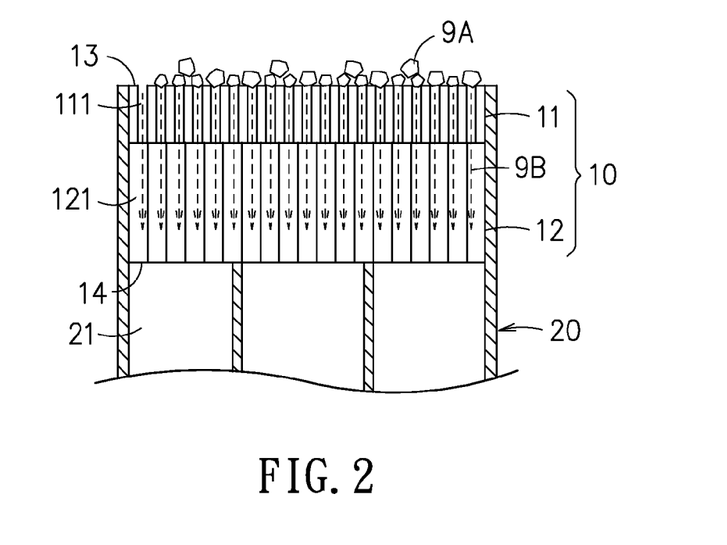
FIG. 2 and FIG. 3 are enlarged diagrams showing a filter used in the present disclosure being supported by different supporting structures according to different embodiments of the present disclosure.

As shown in FIG. 2, the filter 10 is composed of a filtration layer 11 and an absorption layer 12, in which one surface of the filtration layer 11 that is orientated opposite to the absorption layer 12 is defined to be a first side 13 of the filter 10, i.e. the top of the filter 10 as shown in the embodiment of FIG. 2, and one surface of the absorption layer 12 that is orientated opposite to the filtration layer 11 is defined to be a second side 14 of the filter 10, i.e. the bottom of the filter 10 as shown in the embodiment of FIG. 2. The first side 13 is provided for a solid-liquid mixture to be placed thereon. In this embodiment, the supporting structure 20, that is indicated as the shadow components on the FIG. 2, is used supporting and fixedly securing the filter 10, and the supporting structure 20 can be made of any material, only if it is able to stably support the filter 10. For example, the supporting structure 20 can be made of a metal with sufficient rigidity. Moreover, the filtration layer 11 is formed with a plurality of first holes 111 while allowing each first hole to be formed in a diameter smaller than the particle size of any solid 9A existed in the solid-liquid mixture, and the absorption layer 12 is formed with a plurality of second holes 121.

In a TW patent application that is applied by the same applicants of the present disclosure at 2009, Dec. 15 with the TW application number of Ser. No. 09/814,841, and published on Jun. 16, 2011 with the TW publication number of 201119726, entitled "filter structure and method for filtrating", a filter structure compose of a first porous layer and a second porous layer is disclosed. Operationally when such filter structure is used for filtering a solid-liquid mixture, the second porous layer that is arranged as the top layer of the filter structure can block the solid objects containing in the solid-liquid mixture from passing through the filter structure since the holes thereof is formed with a diameter that is smaller than the particle size of any solid existed in the solid-liquid mixture, and the first porous layer that is arranged as the bottom layer of the filter structure is able to absorb the liquid containing in the solid-liquid mixture by capillary effect since the holes thereof is comparatively larger in diameter. Thereafter, the liquid absorbed in the first porous layer can be squeeze out of the first porous layer simply by pressing the first porous layer. Moreover, by the repetitive squeezing and the releasing of the squeezing, any particle that clogs the holes of the second porous layer can be loosened in a manner similar to a reverse rinse process, and thus the clogging of the second porous layer can be relieved and consequently the lifespan of the whole filter structure can be prolonged.

In this disclosure, the filter 10 is substantially the filter structure disclosed in the aforesaid patent application, but the diameters of the first holes 111 on the filtration layer 11 and the diameters of the second holes 121 on the absorption layer 12 are designed according to the type of the solid-liquid mixture that is to be filtered. For instance, when it is used for filtering an active sludge, the first holes 111 should be formed smaller than 0.5 µm in diameter; for filtering a flocculated active sludge, the first holes 111 should be formed smaller than 100 µm in diameter; for algae harvesting, the first holes 111 should be formed smaller than 50 µm in diameter. Correspondingly, the second holes 121 formed on the absorption layer 12 should be formed with a diameter larger than that of the first hole 111 on the filtration layer 11, and smaller than 0.457 cm. Moreover, the filtration layer 11 can be made of a polymer, such as polyvinyl acetate (PVA), polyethersulfone (PES), triacetyl cellulose film (TAC), poly propylene, polyvinyl chloride (PVC), or other suitable porous cellulosic materials, or even ceramics. Similarly, the absorption layer 12 can be made of a polymer, such as polyvinyl acetate (PVA), polyurethane, poly(acrylic acid), polyacrylamide (PAM), poly(ethylene), poly(styrene), or other suitable foam materials, or even other suitable liquid absorption materials, such as nonwoven fabrics and artificial fabrics.

As shown in FIG. 2, since each of the first holes 111 on the filtration layer 11 is formed in a diameter smaller than the particle size of any solid 9A existed in the solid-liquid mixture, and when the solid-liquid mixture is fed to the filter 10, the solids 9A will be blocked by the filtration layer 11 while only allowing the liquid 9B to penetrate the filtration layer 11 by gravity and the capillary effect from the absorption layer 12 so as to be absorbed by and contained in the absorption layer 12. Operationally, for enhancing the liquid 9B to flow smoothly and rapidly into the absorption layer 12, each of the second holes 121 of the absorption layer 12 is formed in a diameter larger than that of the first hole 111. Accordingly, the filter 10 of the present disclosure is designed based upon the capillary principle for dewatering, and is able to filter solids and absorb liquid without the cooperation of a vacuum filtering system or a pump pressurization system, resulting that the cost and energy for the vacuum filtering system or the pump pressurization system are saved.

Figure 3:
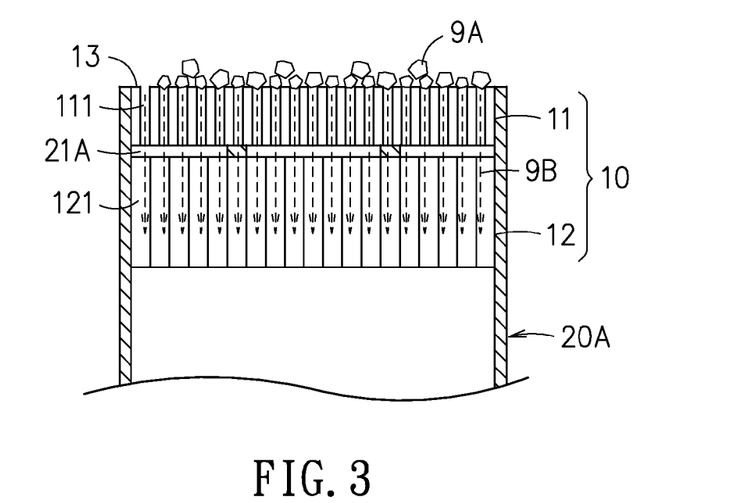

In an embodiment shown in FIG. 3, the supporting structure 20A that is arranged piercing through the filter 10 is configured with a third hole 21A in a diameter larger than the diameters of the first and the second holes 111, 121, by that the liquid 9B can flow smoothly from the first holes 111 to the second holes 121 through the third hole 21A. The configuration of the supporting structure 20 as well as the way relating to how the supporting structure 20 is assembled with the filter that are shown in this embodiment are only for illustration, and thus both the configuration and the assembling of the supporting structure 20 are not limited thereby, only if it is able to support and fixedly secure the filter. For instance, as the embodiment shown in FIG. 2, the supporting structure 20 can be mounted to the bottom of the filter 10; or as the embodiment shown in FIG. 3, the supporting structure 20A can be arranged piercing through the filter 10 to a position between the filtration layer 11 and the absorption layer 12. Other than that, the supporting structure 20A can be arranged piercing only through the absorption layer 12, or even all the way through the filtration layer 11. In addition, it is also feasible to mount the supporting structure 20 on the top of the filtration layer 11. Nevertheless, no matter how the supporting structure 20 is arranged, it will not obstruct the depositing of the solids 9A and also will not block the smooth flowing of the liquid 9B, since the hole formed on the supporting structure 20 is comparatively larger than those formed on the filter 10. Moreover, since there is no special requirement relating to the material and the configuration of the supporting structure 20, the supporting structure 20 can simply be made of a metal with sufficient rigidity into a shape suitable to be used as a housing for the filtration dehydration apparatus, or as a platform for supporting the filtration dehydration apparatus with high stability. In addition, the supporting structure 20 of FIG. 2 and the supporting structure 20A of FIG. 3 can be integrated and used as one new supporting structure for the present disclosure.

As shown in FIG. 1 and FIG. 2, the solid collector 30, that is used for collecting solids 9A left on the first side 13, is configured with at least one scraper 31. In the embodiment shown in FIG. 1, there are two scrapers 31 mounted on a loop rail 32 at positions opposite to each other, whereas the loop rail 32 is composed of a chain, gears and motors. As shown in FIG. 1, there are two turn-around points 321, 322 defined on the loop rail 32 at positions opposite to each other, by that the scraper 31 that is being brought along to move by the circulating loop rail 32 in a direction parallel to a first direction F1 will be guided to turn 180 degree so as to move in a direction opposite to the first direction F1 after passing the turn-around point 321, and thereafter, after the scraper 31 moves passing another turn-around point 322, it will than again move in a direction parallel to the first direction F1. As shown in FIG. 1, when the scraper 31 is moving at the bottom portion of the loop rail 32, it will engage with the first side 13 for scraping off solids 9A left one the first side 13 of the filter 10, and as soon as such scraper reaches the turn-around point 321, the solids 9A whichever is being scraped off by the scraper 31 will be disposed into a container 33 through a ramp 34 arranged connecting the container 33 and the supporting structure 20. It is noted that the container 33 is provided specifically for storing the solids 9A that are being scrapped off from the first side 13 of the filter 10.

It is noted that although there is no specific restriction relating to the size and shape of the filter 10, it is formed as a bar-like rectangle with a specific width, and correspondingly, each of the scrapers 31 should be formed with a proper width for enabling the same to scrape off all the solids 9A deposited on the filter 10 when it is being driven to move from the turn-around point 322 on the loop rail 32 to another turn-around point 321.

Figure 4:
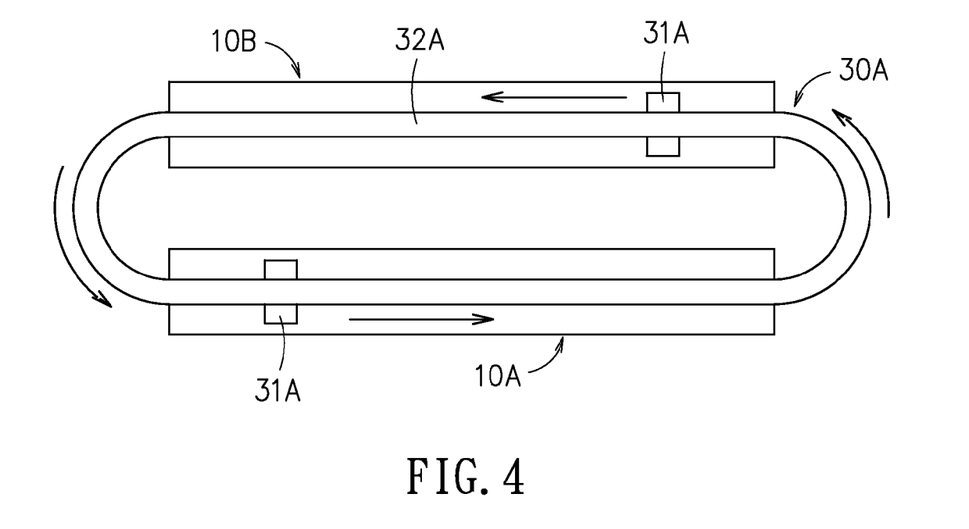
FIG. 4 is a top view of a solid collector according to an embodiment of the present disclosure.

Please refer to FIG. 4, which is a top view of a solid collector 30 according to an embodiment of the present disclosure. In FIG. 4, the solid collector 30A is arranged at a position above two parallelly disposed filters 10A and 10B, and similarly has two scrapers 31A mounted on a loop rail 32A at positions opposite to each other for allowing the two scrapers 31A to scrap off the solids deposited on the two filters 10A, 10B respectively but synchronously. In addition to the loop rail 32A in this embodiment that is arranged to circulate in a manner different from the one disclosed in FIG. 1, by the dual-filter/dual-scraper design in the present embodiment, not only the working efficiency of the two scrapers is enhanced, but also the idle time of the two scrapers is reduced. Since both the loop rails 32 and 32A disclosed in FIG. 1 and FIG. 4 are used only for bringing along the scrapers 31 and 31A to move, they can be replaced by other types of driving devices only if they can achieve the same function for driving the scrapers 31 and 31A to move about and engage with the filters 10, 10A and 10B.

As the solid collector 30 is the present disclosure is designed only for scrapping off and collecting solids deposit on the filter 10, such as the solid collectors 30, 30A disclosed in the abovementioned embodiments, the filtration dehydration apparatus of the present disclosure further includes an extrusion unit 40 to be used for pressing the absorption layer 12 of the filter so as to squeeze liquid that is absorbed by the absorption layer 12 out of the filter 10, as shown in FIG. 5 to FIG. 10.

Figure 5:
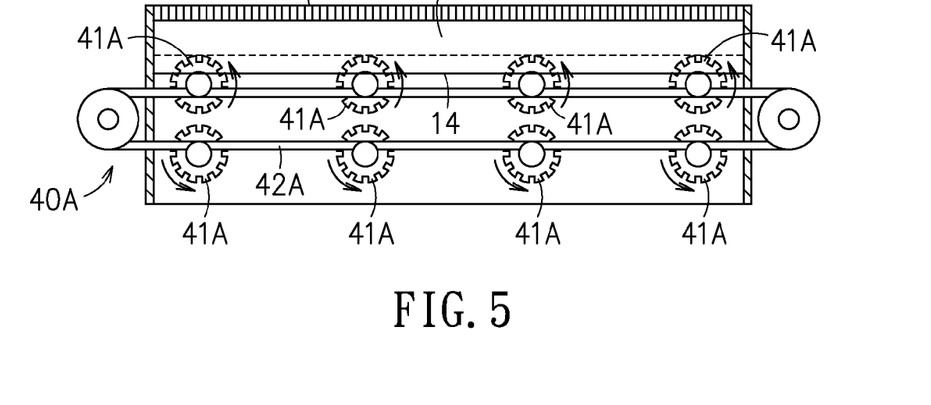
FIG. 5 to FIG. 10 are schematic diagrams showing various extrusion units according to different embodiments of the present disclosure.

In an embodiment shown in FIG. 5, the disclosed extrusion unit 40 is substantially a roller device 40A that is arranged on a second side 14 of a filter 10, and is composed of a plurality of rollers 41A and a driver 42A in a manner that the driver 42A is composed of a chain, gears and motors; and the plural rollers 41A are arranged for allowing the same to be driven to rotate in synchronization by the driver 42A while engaging to the second side 14 of the filter 10 for squeezing the absorption layer 12, whereas the absorption layer 12 is indicated as by the dotted line in FIG. 5. By the lines and patterns embossed on the surfaces of those rollers 41A, liquid being squeezing out of the absorption layer 12 by the pressing of the rollers 41A can be drain easily away from the rollers 41A through those lines and patterns and then flow into a container 33.

Figure 6:
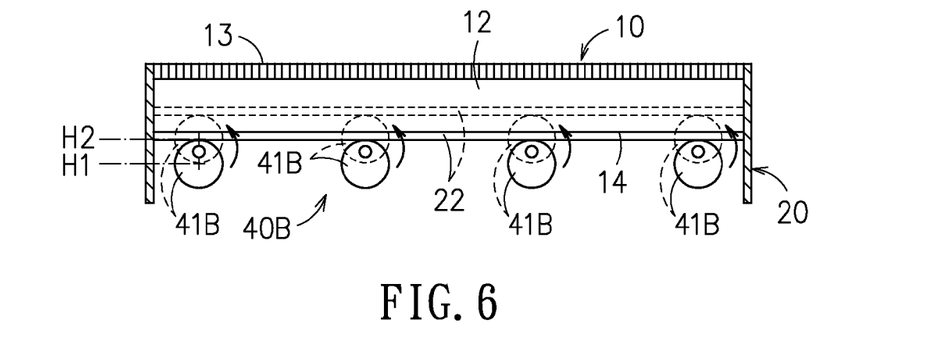

In an embodiment shown in FIG. 6, in addition to the supporting structure 20 is further comprised of a movable pressure plate 22, the disclosed extrusion unit 40 is substantially an eccentric gear device 40B that is arranged on a second side 14 of a filter 10, and is composed of a plurality of eccentric wheels 41B and a driver in a manner that each eccentric wheel 41B is further configured with a disengaging height H1 and an extrusion height H2, and the plural eccentric wheels 41B are arranged for allowing the same to be driven to rotate in synchronization by the driver while enabling each eccentric wheel 41B to engage and push the pressure plate 22 to press on and squeeze the absorption layer 12 when each eccentric wheel 41B is being driven to reach the extrusion height H2, as indicated by the dotted line in FIG. 6.

Figure 7:
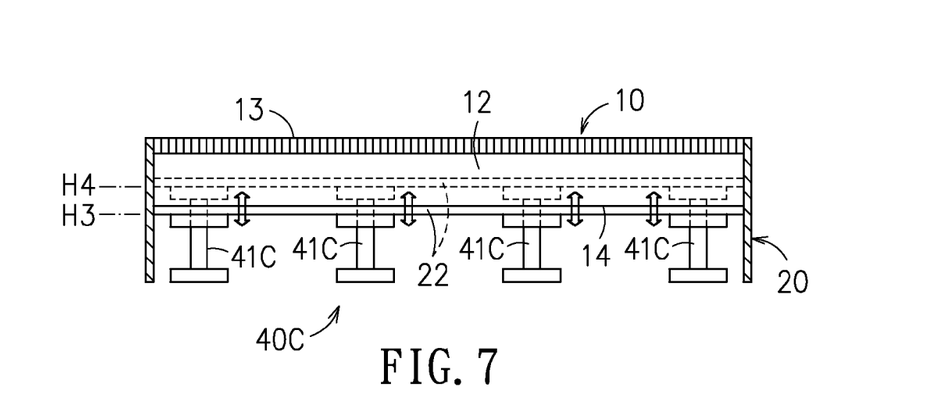

In an embodiment shown in FIG. 7, in addition to the supporting structure 20 is further comprised of a movable pressure plate 22, the disclosed extrusion unit 40 is substantially a magnetic spring device 40C that is composed of a plurality of magnetic springs 41C and a driver in a manner that each magnetic spring 41C is further configured with a disengaging height H3 and an extrusion height H4, and the plural magnetic springs are arranged for allowing the same to be driven to raise/lower in synchronization by the driver while enabling each magnetic spring 41C to engage and push the pressure plate 22 to press on and squeeze the absorption layer 12 when each magnetic spring 41C is being driven to reach the extrusion height H3 corresponding thereto.

Figure 8:
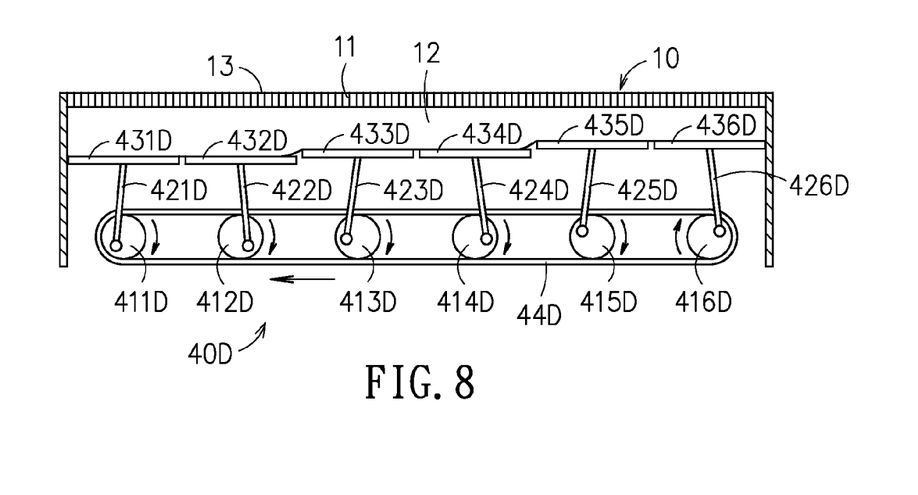
Figure 9:
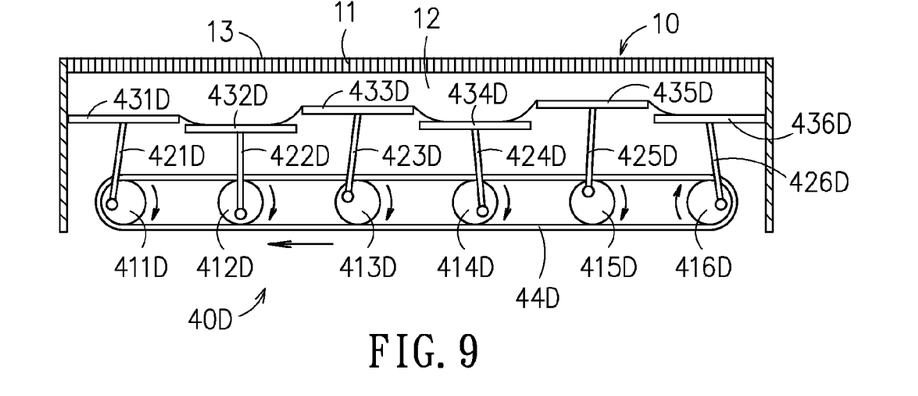

Please refer to FIG. 8 and FIG. 9, which show a multi-stage extrusion unit according to an embodiment of the present disclosure. As shown in FIG. 8 and FIG. 9, the multi-stage extrusion unit is substantially a first multi-stage extrusion unit 40D, which is arranged at a surface of the absorption layer 12 that is opposite to the filtration layer 11, i.e. the first multi-stage extrusion unit 40D is disposed at the bottom of the absorption layer 12. Moreover, the first multi-stage extrusion unit 40D is composed of a plurality of rollers 411D~416D, and each of the plural rollers 411D~416D has a driving element 421D~426D that is eccentrically and pivotally mounted thereon, while allowing the plural driving elements 421D~426D to be mounted respectively to their corresponding rollers 411D~416D at different positions with respect to one another; whereas each of the plural driving elements 421D~426D is coupled to a pressure plate 431D~436D by an end thereof that is opposite to an end thereof coupling to its corresponding roller 411D~416D. In the embodiment shown in FIG. 8, for the two the pressure plates 431D and 432D that are arranged at positions of the same height, the driving element 421D of the pressure plate 431D is coupled to its corresponding roller 411D eccentrically to the left of the roller 411D, while the driving element 422D of the pressure plate 432D is coupled to its corresponding roller 412D eccentrically to the right of the roller 412D. In addition, for the two the pressure plates 433D and 434D that are arranged at positions of the same height, the driving element 423D of the pressure plate 433D is coupled to its corresponding roller 413D eccentrically to the left of the roller 413D, while the driving element 424D of the pressure plate 434D is coupled to its corresponding roller 414D eccentrically to the right of the roller 414D. Moreover, for the two the pressure plates 435D and 436D that are arranged at positions of the same height, the driving element 425D of the pressure plate 435D is coupled to its corresponding roller 415D eccentrically to the left of the roller 415D, while the driving element 426D of the pressure plate 436D is coupled to its corresponding roller 416D eccentrically to the right of the roller 416D. It is noted that the plural rollers 411D~416D are arranged for allowing the same to be driven to rotate in synchronization by a driver, such as a motor but is not limited thereby. In an embodiment, the plural rollers 411D~416D can be connected directly to the driver in respective, or the plural rollers 411D~416D can first be assembled into a circulating chain, so that the plural rollers 411D~416D can be driven to rotate when the circulating chain 44D to being driven to circulate by the driver. As shown in FIG. 9, The rotating rollers 411D~416D will bring along their corresponding driving elements 421D~426D to move accordingly, and since the plural driving elements are eccentrically arranged at different positions on their corresponding rollers 411D~416D, the plural pressure plates 431D~436D will be brought along to move asynchronously and reciprocatingly upward and downward between a disengaging height and an extrusion height, and thereby, enabling the pressure plates 431D~436D to press on and squeeze the absorption layer 12 asynchronously and reciprocatingly when each pressure plate 431D~436D is being driven to reach the extrusion height corresponding thereto so as to achieve a multi-stage extrusion operation upon the absorption layer 12. As shown in FIG. 9, the plural pressure plates 431D~436D are positioned at different heights so that the different portions of the absorption layer 12 corresponding to different pressure plates 431D~436D are being pressed at different stages.

According to the operation principle of the embodiment described in the present disclosure, the absorption layer can be made of a polymer, such as polyvinyl acetate (PVA), polyurethane, poly(acrylic acid), polyacrylamide (PAM), poly(ethylene), poly(styrene), or other suitable foam materials, or even other suitable liquid absorption materials, such as nonwoven fabrics and artificial fabrics. It is noted that the aforesaid materials are characterized by their resilience that they will generate a recovering reaction force while being squeezed or deformed. Thereby, during the squeezing of the plural pressure plates 431D~436D, the resilience of the absorption layer 12 that is made of any of the aforesaid materials will continuously generate a reaction force against the pressing force of the plural pressure plates 431D~436D; and as soon as the squeezing is completed and the plural pressure plates 431D~436D are released and retracted, the reaction force will force the plural pressure plates 431D~436D to move opposite to their previous pressing directions so as to assist the retracting of the plural pressure plates 431D~436D. In addition to the resilience of the absorption layer 12, the weights of the plural pressure plates 431D~436D can sometimes have the same effect as the reaction force resulting from the resilience. That is, in a condition when the plural pressure plates 431D~436D are arranged for enabling the same to move upward for pressing upon the absorption layer 12 that is disposed above the plural pressure plates 431D~436D, the weights of the plural pressure plates 431D~436D that work as downward forces by gravity must be overcome so as to allow the pressure plates 431D~436D to move upward; but when the plural pressure plates 431D~436D are released and retracted, the weights of the plural pressure plates 431D~436D actually can act for assisting those pressure plates 431D~436D to move downward. Since the plural pressure plates 431D~436D are brought along to move asynchronously by one driver, the resilience and weight that are working against the squeezing or assisting the retracting are designed to roughly counter each other out, and thereby, not only a driver with smaller horsepower can be sufficient for the job, but also the energy consumption can be reduced.

Figure 10:
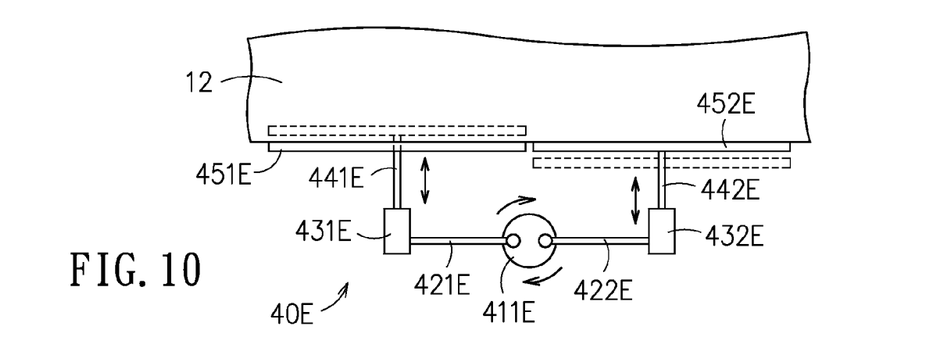

Please refer to FIG. 10, which show a multi-stage extrusion unit according to another embodiment of the present disclosure. As shown in FIG. 10, the multi-stage extrusion unit is substantially a second multi-stage extrusion unit 40E, which is composed of a roller 411E, and the roller has two driving elements 421E, 422E that are eccentrically and pivotally mounted on two opposite sides of the roller 411. In addition, each of the two driving elements 421E, 422E is coupled to an engaging part 431E, 432E by an end thereof that is opposite to an end thereof coupling to the roller 411E; whereas each engaging part 431E, 432E is further configured with a drive shaft 441E, 442E that is further connected to a pressure plate 451E, 452E. Thereby, the roller 411E is arranged for allowing the same to be driven to rotate by a driver so as to enable the two driving elements 421E, 422E to be brought along to rotate accordingly, and thereby, brought along their corresponding pressure plates 451E, 452E to move asynchronously and reciprocatingly upward and downward in opposite directions between a disengaging height and an extrusion height so as to press on and squeeze the absorption layer 12 asynchronously and reciprocatingly when each pressure plate is being driven to reach the extrusion height corresponding thereto for achieving a multi-stage extrusion operation upon the absorption layer, similar to that shown in FIG. 8. It is noted that the second multi-stage extrusion unit 40E shown in FIG. 10 can be replaced by the first multi-stage extrusion unit 40D of FIG. 8, or similarly, the first multi-stage extrusion unit 40D shown in FIG. 8 can be replaced by three sets of the second multi-stage extrusion unit 40E of FIG. 10, while in the three set of the second multi-stage extrusion unit 40E, allowing the driving elements to couple to their respective rollers at different position according to actual requirements, so as to achieve a multi-stage extrusion operation upon the absorption layer.

As the embodiments shown in FIG. 5 to FIG. 10, it is noted that there can be a variety of extrusion units 40 capable of being adapted for the filtration dehydration apparatus of the present disclosure. Thus, other than the disclosed roller device 40A, eccentric wheel device and magnetic spring device, there can be other hydraulic devices or pneumatic devices capable of being adapted for exerting a force on the pressure plate 22 so as to squeeze the absorption layer 12. It is noted that in response to those different extrusion units 40, the supporting structure 20 should be designed differently to cope with the extrusion unit 40 being used. Moreover, the design of the extrusion unit 40 manifests itself most significantly in that: during the squeezing of the absorption layer 12 by the extrusion unit 40, a portion of the liquid being squeezed out of the absorption layer 12 is forced to flow reversely to the first side 13 of the filter 10, causing the solids 9A that is deposited on the filtration layer 11 to be washed away and thus released. Consequently, not only the filtration layer 11 is prevented from being clogged by the solids 9A, but also it is easier for the solid collector 30 to scrap off the solids 9A out of the filter 10. In addition, comparing to the conventional way for cleaning filter belt by high pressure water, the present disclosure is more cost efficient in view of the amount of water used and the operation cost. In addition, although in the embodiments shown in FIG. 5 to FIG. 10, the absorption layers 12 are being pressed by the bottom thereof, i.e. the squeezing of the absorption layer 12 is enabled by exerting an upward pressing force upon the second side 14, it is also feasible to arrange the same extrusion unit 40 above the filter 10 so as to exerting a downward pressing force upon the first side 13 for squeezing the absorption layer 12.

Figure 11:
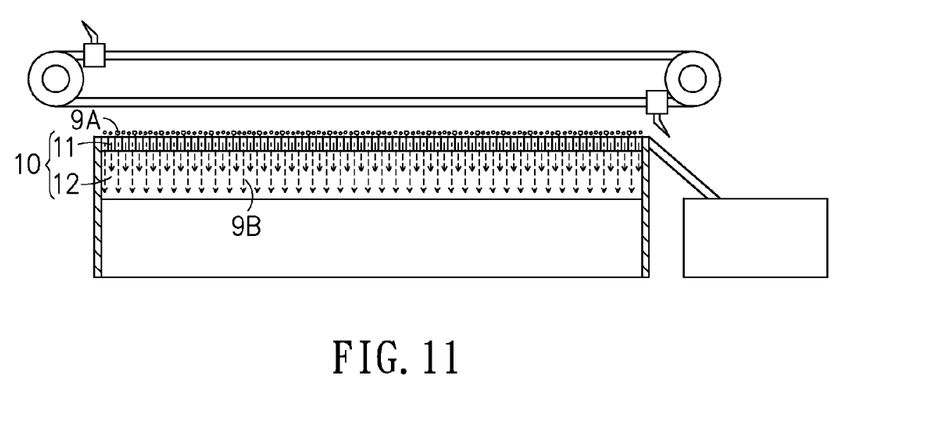
FIG. 11 to FIG. 13 are schematic diagrams showing consecutive operation in a filtration dehydration apparatus in accordance with an embodiment.
Figure 12:
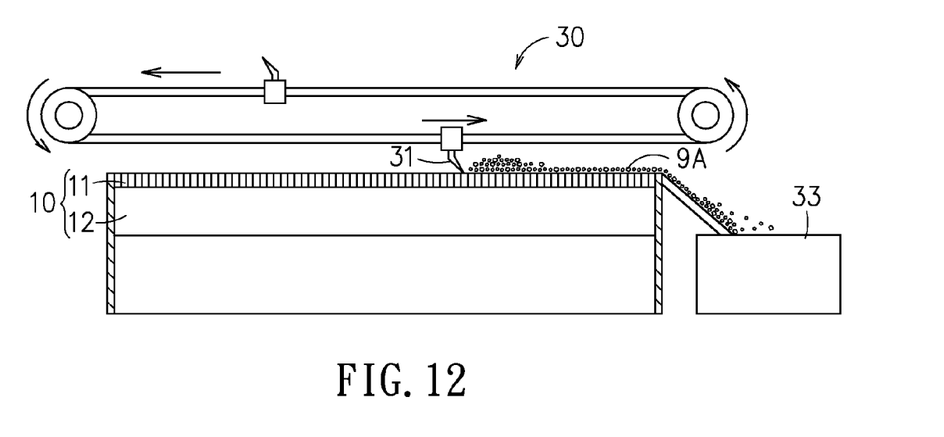
Figure 13:
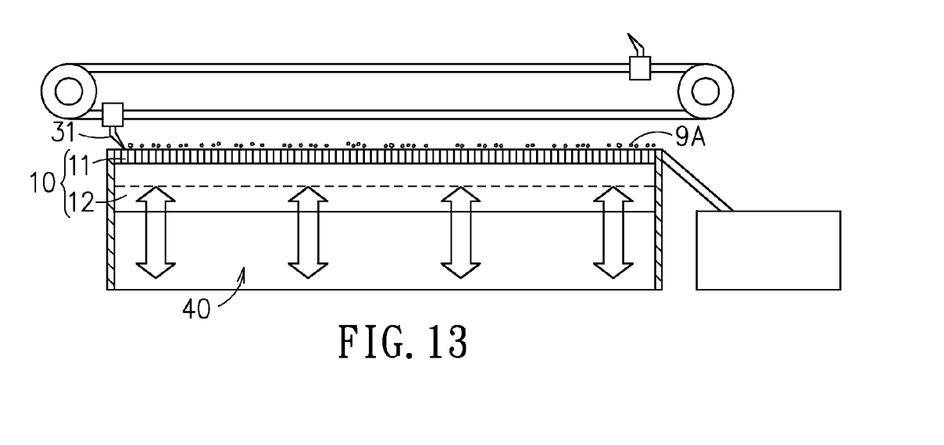

Please refer to FIG. 11 to FIG. 13, which are schematic diagrams showing consecutive operation in a filtration dehydration apparatus of the present disclosure. In FIG. 11, when a solid-liquid mixture is fed to a filter 10, the solids 9A containing in the mixture will be blocked by the filtration layer 11 while the liquid 9B in the mixture will penetrate the filtration layer 11 and then being absorbed by the absorption layer 12, but at the same time, the solid collector 30 is not activating. After the solid-liquid mixture is fed to a filter 10 and is sitting there for a specific period of time for allowing the solids 9A and the liquid 9B are completely separated, the solid collector 30 is then being activated for enabling the scraper 31 to scrap off the solids 9A out of the filtration layer 11 and toward the container 33, as shown in FIG. 12. Nevertheless, it is noted that at the moment the absorption layer 12 is already saturated by the liquid 9B, so that after the scrapping, the extrusion unit 40 will be activated for exerting a pressure upon the absorption layer 12, as shown in FIG. 13, so as to squeeze the liquid out of the absorption layer 12 while allowing a portion of the liquid to flow backward to the filtration layer 11 for releasing some small solids 9A that are clogged inside the filtration layer 11 so as to be scrapped off in the next scrapping of the scraper 31. Operationally, the two steps shown in FIG. 12 and FIG. 13 can be performed repetitively, or can be performed reversely that by performing the squeezing prior to the scrapping, or even by repeating the squeezing multiple times before one scrapping, that is, in any case, the mixture feeding, the sitting for absorption, the squeezing and the scrapping should be performed orderly and continuously according to actual requirement.

After completing the aforesaid steps for separating the solid and liquid in the solid-liquid mixture that is being fed to the filter 10, the filter is available for receiving another feeding of the solid-liquid mixture. Thus, the filtration dehydration apparatus further comprises a feed hopper unit, for disposing a batch of the solid-liquid mixture uniformly on the filter 10. There can be a variety of feed hopper units suitable for the present disclosure, as the two embodiments shown in FIG. 11 and FIG. 12.

Figure 14:
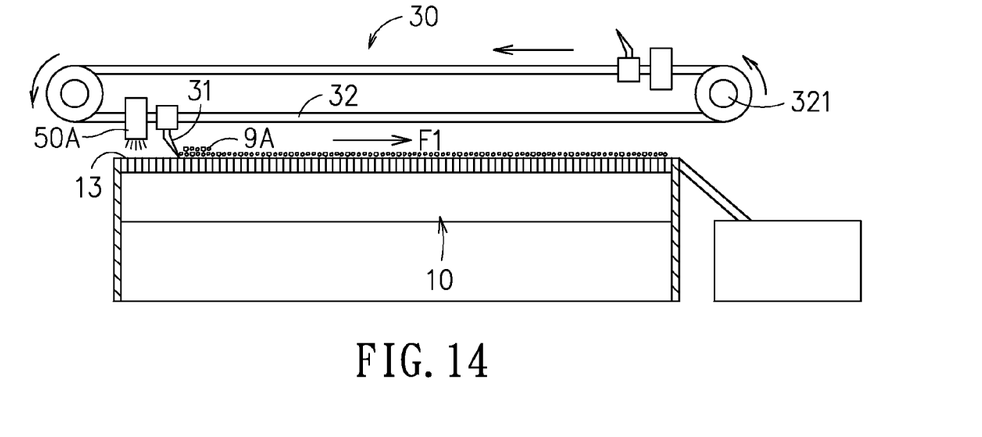
FIG. 14 to FIG. 16 are schematic diagrams showing various feed hopper units according to different embodiments of the present disclosure.

In the embodiment shown in FIG. 14, the feed hopper device is configured with at least one hopper 50A and a sensor in a manner that each hopper 50A is mounted above the loop rail 32 of the solid collector 30 at a position rear to a scraper 31 corresponding thereto while allowing the hopper 50A to move in synchronization with the scraper 31 in the same direction parallel to the first direction F1, and the sensor is arranged on the moving path of the scraper 31 for enabling the same to detect the position of the scraper 31 so as to activate the corresponding hopper 50A for feeding the solid-liquid mixture to the first side 13 of the filter 10 as soon as the scraper 31 starts to engage with the filter 10 for scrapping off solids 9A, and then to deactivate the hopper 50A for stopping the feeding at the time when the scraper 31 is about to reach the turn-around point 321 of the loop rail 32.

Figure 15:
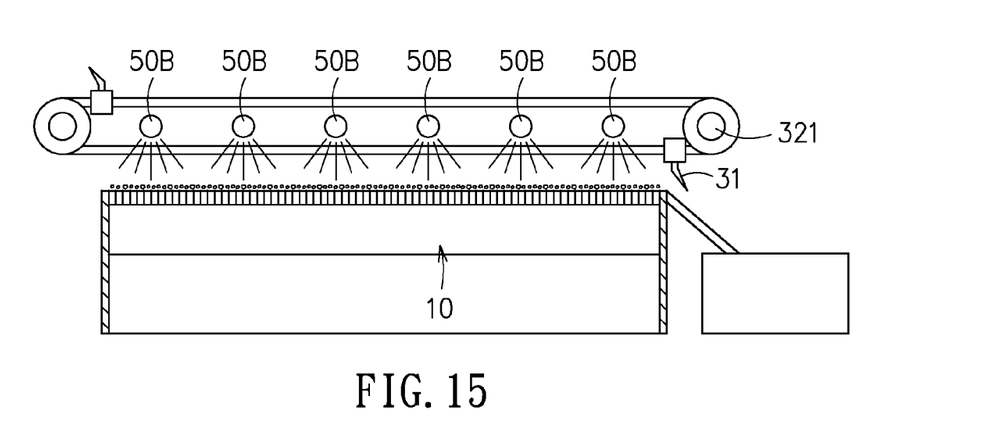

In the embodiment shown in FIG. 15, the feed hopper device is configured with a plurality of hoppers 50B, each being electrically connected to a control switch, which is used for controlling the activation of each of the plural hoppers 50B for feeding the solid-liquid mixture to the first side 13 of the filter 10. Moreover, the control switch is further connected to a sensor, which is provided for detecting the position of the scraper 31 to be used for controlling the control switch to activate the corresponding hopper 50B for feeding the solid-liquid mixture to the first side 13 of the filter 10 as soon as the scraper 31 is about to reach the turn-around point 321 of the loop rail 32, representing the scraper 31 had already accomplished a solid scrapping-off operation for the previous batch of the solid-liquid mixture.

Figure 16:
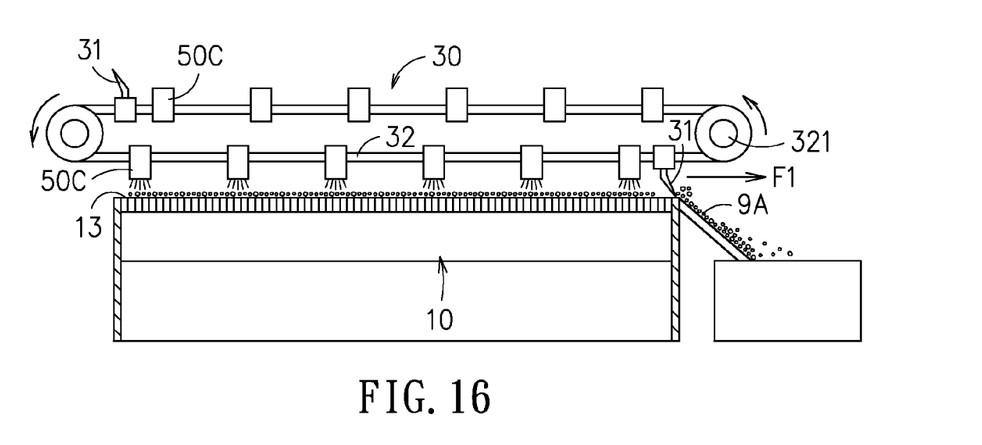

It is noted that the feed hopper device shown in the embodiment of FIG. 16 is substantially the combination of the one shown in FIG. 14 and the one shown in FIG. 15. In FIG. 16, the feed hopper device is configured with a plurality of hopper 50C, each being electrically connected to a control switch, and a sensor in a manner that the plural hoppers 50C are mounted above the loop rail 32 of the solid collector 30 at positions rear to a scraper 31 corresponding thereto while allowing the plural hoppers 50C to move in synchronization with the scraper 31 in the same direction parallel to the first direction F1, and the sensor is arranged on the moving path of the scraper 31 for enabling the same to detect the position of the scraper 31 so as to activate the corresponding hoppers 50C for feeding the solid-liquid mixture to the first side 13 of the filter 10 according to the time when the scraper 31 starts to engage with the filter 10 for scrapping off solids 9A, and then to deactivate the plural hoppers 50C for stopping the feeding at the time when the scraper 31 is about to reach the turnaround point 321 of the loop rail 32.

To sum up, the present disclosure provide a filtration dehydration apparatus, capable of operating while having its filter to be fixed motionlessly so as to operate in an energy efficient manner with high processing capacity, since only the solid collector 30 and the extrusion unit 40 are required to be powered to operate.

Experimentally for harvesting 1 kg of algae on a collection area of 180 m² using a scraper 31 of 1 m width and weighted about 10 kg that is capable of resulting a friction of 12 kg from the scrapping of the scraper 31 on the collection area, the work of the scrapping of the scraper 31 for about 180 m is 1800 kg×m, i.e. 0.006 kWh, and the energy consumption for returning the scraper 31 back to its original position is about the same, so that the energy consumption for the moving of the scraper 31 is about 0.012 kWh/kg. Therefore, the total energy consumption of the filtration dehydration apparatus is about 0.012+0.001=0.013 kWh/kg, according to that with reference to the conventional mechanical transmission efficiency of 10%, the final energy consumption is 0.13 kWh/kg, which is considered to be a great improvement comparing to the 0.45 kWh/kg energy consumption of conventional belt filter presses, the 0.88 kWh/kg energy consumption of conventional high-pressure filters, the 5.9 kWh/kg energy consumption of conventional vacuum filters, and the 1 kWh/kg energy consumption of conventional centrifugal filters.

In addition, the energy consumption improvement of the extrusion unit in the present disclosure is provided and proved in the following table:

| | 1 m³ water containing filter in each squeeze | | | |
| --- | --- | --- | --- | --- |
| Squeeze index (%) | Pressure kg/m² | Work kg*m | Dewatering m³ | Energy consumption kWh/m³ |
| 10 | 0 | 15 | 0.1 | 0.0004 |
| 25 | 300 | 64 | 0.25 | 0.0007 |
| 35 | 510 | 137 | 0.35 | 0.0011 |
| 50 | 780 | 243 | 0.5 | 0.0013 |
| 65 | 970 | 520 | 0.65 | 0.0022 |

According a prototype 1.5×0.75×1.5 filtration dehydration apparatus of the present disclosure that is equipped with a filtration layer 11 of 50 μm filter cloth with about 0.5 m² filtration area and an absorption layer 12 of 100 μm PVA, the harvesting rate for harvesting chlorella vulgaris fluid with an O.D value of 1.8 is more than 90% and at a concentration of about 12% to 16% while achieving a harvest load of 300~500 L/hr.

Therefore, it is concluded that by the design for enabling its filter to be fixed motionlessly during operation, the filtration dehydration apparatus of the present disclosure is capable of operating in a cost efficient and energy efficient manner since not only the energy consumed in the prior art for driving the filter and the fed sludge carried thereon to move is saved, but also the energy consumed by the solid collector 30 and the extrusion unit 40 are reduced. Moreover, as the utilization rate of the filter in the embodiment can achieve about 100% that left almost no idle area, the process capacity of the filtration dehydration apparatus is improved.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A filtration dehydration apparatus, comprising:
   a filter, composed of a filtration layer and an absorption layer while allowing a surface of the filtration layer that is orientated opposite to the absorption layer to be a first side of the filter, and allowing a surface of the absorption layer that is orientated opposite to the filtration layer to be a second side of the filter;
   a supporting structure, for supporting and fixedly securing the filter;
   a solid collector, for collecting any solid object left on the first side solid collector comprising:
      at least one scraper, for scraping off solids left on the first side of the filter;
      a driver, for driving the at least one scraper to move; and
      a container, for storing the solids after being scrapped off the first side of the filter; and
   an extrusion unit, for pressing the absorption layer so as to squeeze liquid containing in the absorption layer out of the same;
   wherein, the first side is provided for a solid-liquid mixture to be placed thereon for allowing the liquid containing in the solid-liquid mixture to flow into the absorption layer through the filtration layer while enabling any solid object in the solid-liquid mixture to be filtered out and thus left on the first side.

2. The filtration dehydration apparatus of claim 1, wherein the supporting structure is arranged piercing through the filter.

3. The filtration dehydration apparatus of claim 1, wherein the filtration layer is formed with a plurality of first holes while allowing each first hole to be formed in a diameter smaller than the particle size of any solid existed in the solid-liquid mixture, and the absorption layer is formed with a plurality of second holes, while allowing each second hole to be formed in a diameter larger than that of the first hole.

4. The filtration dehydration apparatus of claim 1, further comprising:
   a feed hopper unit, configured with at least one hopper and a sensor in a manner that each hopper is arranged to move in synchronization with the scraper corresponding thereto, and the sensor is arranged for enabling the same to detect the position of each of the at least one scraper so as to activate the at least one hopper for feeding the solid-liquid mixture to the first side of the filter accordingly.

5. The filtration dehydration apparatus of claim 1, wherein the at least one scraper is driven to move in a direction parallel to a first direction while allowing the hopper corresponding thereto to move rear to the at least one scraper also in a direction parallel to the first direction, and simultaneously being controlled to feed the solid-liquid mixture to the first side of the filter when the sensor detects the scrapping of the at least one scraper through the first side of the filter.

6. The filtration dehydration apparatus of claim 1, wherein the extrusion unit is substantially a roller device that is arranged on the second side of the filter, and composed of a plurality of rollers and a driver in a manner that the plural rollers are arranged for allowing the same to be driven to rotate in synchronization by the driver while engaging to the second side of the filter for squeezing the absorption layer.

7. The filtration dehydration apparatus of claim 1, wherein the supporting structure is further comprised of a movable pressure plate, and the extrusion unit is substantially a magnetic spring device that is composed of a plurality of magnetic springs and a driver in a manner that each magnetic spring is further configured with a disengaging height and an extrusion height, and the plural magnetic springs are arranged for allowing the same to be driven to raise/lower in synchronization by the driver while enabling each magnetic spring to engage and push the pressure plate to press on and squeeze the absorption layer when each magnetic spring is being driven to reach the extrusion height corresponding thereto.

8. The filtration dehydration apparatus of claim 1, wherein the extrusion unit is substantially a first multi-stage extrusion unit, composed of a plurality of rollers; each of the plural rollers has a driving element that is eccentrically and pivotally mounted thereon, while allowing the plural driving elements to be mounted respectively to their corresponding rollers at different positions with respect to one another; each of the plural driving elements is coupled to a pressure plate by an end thereof that is opposite to an end thereof coupling to its corresponding roller; and the plural rollers are arranged for allowing the same to be driven to rotate by a driver so as to enable the plural pressure plates to be brought along to move asynchronously and reciprocatingly upward and downward between a disengaging height and an extrusion height, and thereby, enabling the pressure plates to press on and squeeze the absorption layer asynchronously and reciprocatingly when each pressure plate is being driven to reach the extrusion height corresponding thereto so as to achieve a multi-stage extrusion operation upon the absorption layer.

9. The filtration dehydration apparatus of claim 1, wherein the extrusion unit is substantially a multi-stage extrusion unit, composed of at least one roller; the at least one roller has a plurality of driving elements that are eccentrically and pivotally mounted on the roller; each of the plural driving elements is coupled to an engaging part by an end thereof that is opposite to an end thereof coupling to the roller; the engaging part is further configured with a drive shaft that is further connected to a pressure plate; and the at least one roller is arranged for allowing the same to be driven to rotate by a driver so as to enable the plural driving elements to be brought along to rotate accordingly, and thereby, brought along their corresponding pressure plates to move asynchronously and reciprocatingly upward and downward between a disengaging height and an extrusion height so as to press on and squeeze the absorption layer asynchronously and reciprocatingly when each pressure plate is being driven to reach the extrusion height corresponding thereto for achieving a multi-stage extrusion operation upon the absorption layer.

10. The filtration dehydration apparatus of claim 9, wherein the apparatus comprises two driving elements, being eccentrically arranged at two opposite sides of the roller.

11. A filtration dehydration apparatus, comprising:
a filter, composed of a filtration layer and an absorption layer while allowing a surface of the filtration layer that is orientated opposite to the absorption layer to be a first side of the filter, and allowing a surface of the absorption layer that is orientated opposite to the filtration layer to be a second side of the filter;
a supporting structure, for supporting and fixedly securing the filter;
a solid collector, for collecting any solid object left on the first side;
an extrusion unit, for pressing the absorption layer so as to squeeze liquid containing in the absorption layer out of the same; and
a feed hopper unit, configured with a plurality of hoppers that are electrically connected to a control switch to be used for controlling the activation of each of the plural hoppers for feeding the solid-liquid mixture to the first side of the filter accordingly;
wherein, the first side is provided for a solid-liquid mixture to be placed thereon for allowing the liquid containing in the solid-liquid mixture to flow into the absorption layer through the filtration layer while enabling any solid object in the solid-liquid mixture to be filtered out and thus left on the first side.

12. A filtration dehydration apparatus, comprising:
a filter, composed of a filtration layer and an absorption layer while allowing a surface of the filtration layer that is orientated opposite to the absorption layer to be a first side of the filter, and allowing a surface of the absorption layer that is orientated opposite to the filtration layer to be a second side of the filter;
a supporting structure, for supporting and fixedly securing the filter, and comprising at least one movable pressure plate,
a solid collector, for collecting any solid object left on the first side; and
an extrusion unit, for pressing the absorption layer so as to squeeze liquid containing in the absorption layer out of the same, the extrusion unit being substantially an eccentric gear device that is arranged on the second side of the filter, and composed of a plurality of eccentric wheels and a driver in a manner that each eccentric wheel is further configured with a disengaging height and an extrusion height, and the plural eccentric wheels are arranged for allowing the same to be driven to rotate in synchronization by the driver while enabling each eccentric wheel to engage and push the corresponding pressure plate to press on and squeeze the absorption layer when each eccentric wheel is being driven to reach the extrusion height corresponding thereto;
wherein, the first side is provided for a solid-liquid mixture to be placed thereon for allowing the liquid containing in the solid-liquid mixture to flow into the absorption layer through the filtration layer while enabling any solid object in the solid-liquid mixture to be filtered out and thus left on the first side.

\* \* \* \* \*